Patented Oct. 19, 1954

2,692,240

UNITED STATES PATENT OFFICE 2,692,240

REACTIVATION OF ALUMINA SUPPORTED PALLADIUM CATALYSTS

Jerome W. Sprauer, Niagara Falls, N. Y., assignor to E. I. du Pont de Nemours and Company, Wilmington, Del., a corporation of Delaware No Drawing. Application April 18, 1952, Serial No. 283,115

11 Claims. (Cl. 252—412)

This invention relates to a method of reactivating spent palladium hydrogenation catalysts, particularly catalysts comprising metallic palladium supported on alumina.

This application is a continuation-in-part of my application, Serial No. 152,747, filed March 29, 1950, now abandoned.

In most catalytic hydrogenation processes in which organic materials are hydrogenated and in which metallic palladium catalysts are employed, the activity of the catalyst declines with continued use. Thus, in the catalytic reduction by means of hydrogen of alkylated anthraquinones dissolved in an organic solvent using metallic palladium supported on activated alumina as catalyst, as disclosed in my application, Serial No. 125,848, filed November 5, 1949, now Patent No. 2,657,980, the activity of the catalyst gradually and progressively decreases during use.

The exact cause for such decrease in catalyst activity is not clearly understood, but whatever the cause, reactivation of the catalyst after it has been inactivated or spent, or partially so, through use in such processes, is obviously desirable for economic reasons. The present invention is concerned with a simple yet highly effective method for reactivating such spent catalysts.

One object of the invention is to provide an effective method for reactivating spent metallic palladium hydrogenation catalysts comprising metallic palladium supported on alumina. A specific object is a method for reactivating spent hydrogenation catalysts comprising metallic palladium supported on activated alumina, which catalysts have become inactivated, or partially inactivated, through use in catalyzing the hydrogenation of alkylated anthraquinones in organic solvents. These and other objects will be apparent from the following description of the invention.

The above objects are accomplished in accordance with the invention by intimately contacting a spent hydrogenation catalyst comprising metallic palladium supported on alumina, especially activated alumina, which catalyst has become at least partially inactivated through use in hydrogenating an alkylated anthraquinone, with an aqueous solution of a soluble oxidizing agent such as a chlorite, a hypochlorite, a peroxide or an organic peracid. In order that such treatment be effective, it is essential that the treating solution be non-acidic, i. e. have a pH of at least 7. The time and temperature of the treatment as well as the concentration of the oxidizing agent in the treating solution are not particularly critical and are more or less interdependent. The optimum conditions with respect to these features will depend upon the particular treating agent used and the degree of inactivation of the catalyst being treated.

The oxidizing agent employed should be soluble to a substantial extent in the aqueous treating medium. In general, the solubility should be equal to at least 0.1% by weight of the treating solution. A higher solubility is desirable and in the preferred method the aqueous solution employed will contain the oxidizing agent in a concentration corresponding to from about 0.5 to about 2% by weight. However, concentrations as low as 0.1% or lower will exert a substantial reactivating action and can be used advantageously. Solutions of concentrations above about 2%, e. g. as high as 10% or more may also be used, although ordinarily no additional advantage results from such high concentrations.

In the event an oxidizing agent is chosen which is relatively insoluble in water, the solubility may be increased by the addition of a solvent in which the oxidizing agent is more soluble than it is in water, which solvent, however, should be miscible with water. Thus, in the case of certain organic oxidizing agents which are relatively insoluble in water, the addition of a solvent such as methanol effectively increases the concentration of the agent in the treating solution. However, the amount of the added solvent employed should generally not be more than equal to the weight of the water present. Accordingly, the term "aqueous solution" or "aqueous treating medium" is employed herein to mean a solution or medium in which the solvent is water or contains at least 50% by weight of water and any second or other solvent present is miscible with water.

Included among the effective oxidizing agents are certain peroxygen compounds. Among them are the peroxides of the formula ROOH wherein R represents hydrogen or a hydrocarbon radical. Illustrative of such compounds are hydrogen peroxide and the organic hydroperoxides, such as tertiary-butyl hydroperoxide and cumene hydroperoxide. Compounds such as the alkali metal peroxides and perborates, and the corresponding carbonate and phosphate perhydrates and the like as well as compounds such as urea peroxide, which are known to yield hydrogen peroxide in water solutions are the equivalent of hydrogen peroxide for use in the present method. Accordingly, the present invention may be practiced employing aqueous treating media prepared from commercially obtainable solutions of hydrogen peroxide, or by adding to the aqueous medium compounds such as the above mentioned peroxides or other compounds, which yield hydrogen peroxide in aqueous solution.

Other peroxygen type compounds which are effective for the purpose here intended are the organic peracids represented by the general formula RCOOOH wherein R is hydrogen or a hydrocarbon radical. Illustrative of such compounds are peracetic acid, performic acid and perbenzoic acid. It should be noted that not all peroxygen type compounds are effective for the present purpose. Thus, persulfuric acid is of no value for reactivating the present type of palladium catalysts and, therefore, cannot be used in place of, for example, hydrogen peroxide, tertiary-butyl hydroperoxide or peracetic acid.

Another class of oxidizing agents which may be used are the hypochlorites such as the alkali metal hypochlorites, the alkaline earth metal hypochlorites and organic hypochlorites such as tertiary-butyl hypochlorite. A still further class of compounds which may be used are the chlorites such as the alkali metal chlorites and the alkaline earth metal chlorites.

Individually preferred compounds suitable for use as the oxidizing agent are hydrogen peroxide, sodium chlorite, sodium hypochlorite, and peracetic acid. In general, the inorganic alkali metal hypochlorites represent or constitute the preferred class of agents and of these, sodium hypochlorite is most preferred.

The term "inactivated" or "spent" catalyst is used herein to mean a catalyst comprising metallic palladium supported on alumina and particularly, activated alumina, whose activity has been either completely or partially destroyed through use in catalyzing the hydrogenation of an alkylated anthraquinone, in an organic solvent. The term "reactivation" is used to mean the restoration, either partially or completely, of the effectiveness of such a spent catalyst to catalyze such hydrogenation reactions.

In practice, the alumina supported catalyst whose activity has been decreased through use as mentioned above, is subjected to the action of a solution of an oxidizing agent of the type defined above in an alkaline aqueous medium. Generally, a slurry of the spent catalyst particles in an alkaline aqueous solution is prepared. While agitating the resulting slurry at the desired temperature, the oxidizing agent is then added. After a suitable period of time the particles are filtered from the treating solution, washed and dried for reuse in the hydrogenation process. Multiple treatments of the catalyst with the reactivating solution may be used if desired. Ordinarily, the catalyst as it is removed from the hydrogenating system will be washed to free it from readily removable organic materials, such as the solution of the organic compound being hydrogenated, before being subjected to the reactivating treatment. Separation of the spent catalyst from the solution being hydrogenated is conveniently accomplished by use of a centrifuge. The separated catalyst can be effectively washed on the centrifuge to free it of organic materials by successive additions of solvents such as benzene, methanol and finally water.

The invention is illustrated further by the following examples. In the examples all composition percentages are percentages by weight unless stated to be otherwise.

*Example 1*

A spent catalyst which was used to catalyze the hydrogenation of 2-tertiary-butylanthraquinone in a solvent consisting of 60% diisobutyl carbinol and 40% by volume alpha-methylnaphthalene, was filtered from the solution and washed with methanol and finally with water to provide a wet cake of the spent catalyst. This catalyst originally consisted of 0.75% by weight of metallic palladium supported on activated alumina. It was prepared by suspending 100 grams of undried 100–200 mesh activated alumina showing boehmite and gamma alumina X-ray pattern in 200 grams of water heated to 70° C. While agitating the suspension there was added a solution of 1 gram of palladous chloride and 0.4 cc. of concentrated hydrochloric acid in 40 cc. of water. With continued agitation, 1 cc. of 37% formaldehyde solution was added to reduce the palladium salt, and after a short period there was then added 50 cc. of a 5% sodium bicarbonate solution. The mixture was maintained throughout these operations and for 30 minutes thereafter at 70 to 80° C. Finally, 2 cc. of 35% aqueous hydrogen peroxide was added slowly with vigorous stirring. The resulting catalyst particles were filtered, washed with water and dried at 130° C. This method of preparation is essentially that described in Example 1 of my application Serial No. 125,848.

The wet cake of spent catalyst obtained as described above and containing 66 grams catalyst on a dry basis was suspended in 175 cc. of a 5% aqueous sodium bicarbonate solution. 75 cc. of a 5% aqueous solution of sodium hypochlorite were then added. The resulting mixture was stirred intermittently for 15 minutes and then heated to boiling in several minutes time. The solution was decanted and the catalyst particles were washed several times with water by decantation. The catalyst was then suspended in 200 cc. of water to which 5 cc. of 35% aqueous hydrogen peroxide was slowly added with stirring. Following this treatment, the catalyst was filtered, washed with water, and dried in a shallow layer for 2 hours at 100° C.

The catalyst which had been treated in the manner described above was then re-employed to catalyze the hydrogenation of 2-tertiary-butylanthraquinone under the same conditions employed for the original catalyst. Its activity was found to be substantially the same as that of the original catalyst, whereas the activity of the spent ctaalyst before the above reactivation treatment was only about 20% of that of the original catalyst.

*Example 2*

A catalyst containing 0.67% metallic palladium supported on activated alumina was employed to catalyze the hydrogenation of an alkylated anthraquinone in an organic solvent as generally described in Example 1. It was so used until its activity had dropped to about 35% of its original value. The spent catalyst was then filtered from the hydrogenation medium, washed successively with methanol, water and a 5% aqueous sodium bicarbonate solution. The wet catalyst cake containing 48 grams of catalyst on a dry basis was then suspended in 100 cc. of a 5% sodium bicarbonate solution at about 80° C. With vigorous stirring, 50 cc. of a 7% solution of hydrogen peroxide in water was added during about a 10 minute period while maintaining the temperature near the boiling point. The catalyst was then filtered, thoroughly washed with water and dried in a shallow layer for 2 hours at 110° C. The activity of this reactivated catalyst to catalyze the hydrogenation of the alkylated anthraquinone was found to be substantially the same as that of the catalyst when it was freshly prepared.

Example 3

A spent catalyst containing about 0.7% palladium supported on activated alumina was separated from the working solution of a system in which an alkylated anthraquinone dissolved in an organic solvent was being hydrogenated. The separated catalyst, whose activity had decreased about 65% through use, was washed successively with methanol, 50% methanol in water, hot 5% aqueous sodium bicarbonate solution, and water. 20.5 grams of the catalyst on a dry basis were then suspended in 75 cc. of an aqueous solution containing 3.3% sodium bicarbonate and 1.7% sodium chlorite. The suspension was stirred gently for 15 minutes while being heated to the boiling point, after which the catalyst was washed with water by decantation several times and then resuspended in 150 cc. of water. To the resulting suspension, 2 cc. of 35% aqueous hydrogen peroxide was added in increments with stirring, after which the catalyst particles were filtered, washed and dried for 1.5 hours at 110° C. The activity of the reactivated catalyst was found to be substantially the same as that of the original catalyst when tested under substantially the same conditions.

Example 4

About 34 grams of a catalyst containing 0.34% metallic palladium on activated alumina of 8–14 mesh was charged to a fixed-bed type reactor and hydrogen and a working solution consisting of 2-tertiary-butylanthraquinone dissolved in a mixture of 60% diisobutyl carbinol and 40% alpha-methylnaphthalene by volume, were passed concurrently downwardly through the bed until the activity of the catalyst had decreased to about 75% of its original value. The catalyst bed was then successively washed with methanol, hot water and hot 5% aqueous sodium bicarbonate solution. The washed bed was then backwashed for about 0.5 hour with a solution prepared by dissolving 4 cc. of commercial 60% tertiary-butyl hydroperoxide and 1 gram of sodium bicarbonate in 100 cc. of a mixture of equal volumes of methanol and water. This solution was used at a temperature of 80 to 100° C. After this treatment the catalyst bed was washed with water and dried in a current of warm air. Upon again passing hydrogen and the working solution through the catalyst bed, the activity of the catalyst was found to be substantially the same as that observed for the original fresh catalyst.

Example 5

A spent catalyst containing 0.09% metallic palladium supported on activated alumina particles which had become inactivated to about 20% of its original activity by use in a fixed-bed reactor as described in Example 4, was washed with methanol and water and dried in an air stream. Five grams of the washed and dried catalyst were added to an aqueous solution prepared by adding 4 grams of sodium bicarbonate and 2 cc. of a 40% solution of peracetic acid in acetic acid to 20 cc. of water. The resulting suspension had a pH of 8. It was boiled for 10 minutes after which the catalyst particles were filtered, washed and dried at 110° C. for 1 hour. The reactivated catalyst was found to have substantially the same activity as the original fresh catalyst.

The present method is especially effective for reactivating catalysts comprising metallic palladium supported on activated alumina which have become inactivated or partially inactivated through use in catalyzing the hydrogenation of alkylated anthraquinones such as 2-ethyl-, 2-isopropyl-, 2-secondary-butyl-, 2-tertiary-butyl-, 2-secondary-amul-, 1,3-dimethyl-, 2,3-dimethyl-, 1,4-dimethyl- and 2,7-dimethylanthraquinones. Use of such catalysts is highly effective in the hydrogenation of such anthraquinones when dissolved in organic solvents as disclosed in my application Serial No. 125,848. They are also effective in catalyzing the hydrogenation of the corresponding tetrahydroanthraquinones such as tetrahydro-2-ethylanthraquinone and tetrahydro-2-tertiary-butylanthraquinone, to the corresponding anthrahydroquinone derivatives. Such catalysts will be employed in such hydrogenation systems until the catalytic activity thereof has been reduced to a point where reactivation becomes desirable, e. g. to about 25 to 50% of the original value. The catalyst is then separated from the working solution of the hydrogenating system and reactivated by the method herein illustrated whereby its activity may generally be increased to substantially its original effectiveness. The present method may of course be employed to reactivate the catalyst at any desired stage of deactivation through use.

In referring to catalysts comprising metallic palladium supported on activated alumina, the term "activated alumina" is used to mean any natural or synthetic hydrated alumina which has been dehydrated or partially dehydrated by heating in known manner, for example at 300–800° C., whereby a microporous alumina is obtained containing alpha-alumina monohydrate, gamma-alumina, or both. Activated aluminas of this type are well-known and are available commercially. In contrast with such activated aluminas is the well-known form of alumina generally referred to as corundum, which is not microporous and is markedly less suitable than the activated aluminas for use as support material in preparing metallic palladium catalysts for hydrogenations of the above type.

The aqueous treating medium employed in practicing the present method should be non-acidic, i. e. it should have a pH of at least 7. Treating solutions having a pH of 7 to 10 are generally effective although solutions having a pH of about 7.5–9 are preferred. Solutions having an alkalinity higher than about pH 10, e. g. up to pH 14 or higher, can be used but are not recommended since they may attack and tend to destroy the alumina support.

Example 6

Five grams of the washed and dried inactivated catalyst described in Example 5 were suspended in 10 cc. of water and the pH of the suspension adjusted to 3 by the addition of acetic acid. Two cc. of 35% hydrogen peroxide were added and the mixture heated to boiling. The catalyst particles were filtered, washed and dried at 100° C. for 1 hour. The treated catalyst was found to have only 50% of the activity of the original fresh catalyst in a comparative test.

Example 7

About 34 grams of a catalyst containing 0.33% metallic palladium supported on activated alumina of 8 to 14 mesh were used to catalyze the hydrogenation of 2-tertiary-butylanthraquinone as described in Example 4 until the activity of the catalyst had decreased to about 45% of its original value. The catalyst bed was then washed successively with methanol, hot 5% aqueous sodium barcarbonate solution, and cold water. The bed was then washed in two equal increments with 100 cc. of an aqueous 0.7% hydrogen peroxide solution whose pH had been adjusted to 2.5 by addition of acetic acid. Total contact time was about 4 minutes. The bed was washed successively with hot 5% aqueous sodium bicarbonate solution and water and dried in a current of warm air. Upon reusing the treated catalyst as described in Example 4 its activity was found to be only about 55% of the activity of the original fresh catalyst.

Ordinarily, the reactivation treatment will be carried out at a temperature from about 50° C. to the boiling point of the treating solution, e. g. 50–100° C. although any temperature from just above the freezing point of the solution to about the boiling point will effect reactivation to a substantial extent. Temperatures above the atmospheric boiling point of the solution may of course be employed if desired by operating under pressures above atmospheric pressure.

The duration of the treatment with the solution of the oxidizing agent is not particularly critical and a substantial beneficial effect will generally be produced within a matter of minutes, particularly if a temperature within the preferred range is used. Treating times of the order of 5 minutes to 1 hour will be generally practiced. Longer treating times generally result in no added advantage and in some instances treatment for periods longer than the time required to effect the desired or maximum reactivation may be harmful. Thus, when using treating solutions which are highly alkaline, e. g. have a pH substantially above 10, long contact of the catalyst particles with the solution may cause some separation of the palladium from the alumina support, which of course is undesirable. When using a hypochlorite it is desirable to follow the hypochlorite treatment with a wash with aqueous hydrogen peroxide to insure complete decomposition of the hypochlorite.

No oxidation of the metallic palladium component of the catalyst occurs during the present reactivating treatment, regardless of which of the above oxidizing agents is used. Apparently, reactivation results from the oxidizing action of the agent to destroy or render harmless substances which accumulate in or on the catalyst during use and which by their presence poison or inactivate the catalyst.

I claim:

1. A method for reactivating a spent catalyst comprising metallic palladium supported on alumina, said catalyst having become at least partially inactivated through use in catalyzing the hydrogenation of an alkylated anthraquinone, which method comprises intimately contacting said catalyst with a non-acidic aqueous solution of an oxidizing agent from the group consisting of: (a) peroxides of the formula ROOH wherein R is from the group consisting of hydrogen and hydrocarbon radicals; (b) peracids of the formula RCOOOH wherein R is from the group consisting of hydrogen and hydrocarbon radicals; (c) hypochlorites; and (d) chlorites.

2. The method of claim 1 wherein the solution of the oxidizing agent has a pH of 7 to 10.

3. The method of claim 1 wherein the solution of the oxidizing agent has a pH of 7.5 to 9.

4. The method of claim 1 wherein the solution of the oxidizing agent has a pH of 7 to 10 and a temperature of about 50 to 100° C.

5. A method for reactivating a spent catalyst comprising metallic palladium supported on activated alumina, said catalyst having become at least partially inactivated through use in catalyzing the hydrogenation of an alkylated anthraquinone, which method comprises intimately contacting said catalyst with an aqueous solution of an oxidizing agent from the group consisting of: (a) peroxides of the formula ROOH wherein R is from the group consisting of hydrogen and hydrocarbon radicals; (b) peracids of the formula RCOOOH wherein R is from the group consisting of hydrogen and hydrocarbon radicals; (c) hypochlorites; and (d) chlorites, said solution containing 0.1 to 2% by weight of said oxidizing agent and having a pH of 7 to 10.

6. The method of claim 5 wherein the oxidizing agent is peracetic acid.

7. The method of claim 5 wherein the oxidizing agent is hydrogen peroxide.

8. The method of claim 5 wherein the oxidizing agent is sodium chlorite.

9. The method of claim 5 wherein the oxidizing agent is sodium hypochlorite.

10. The method of claim 5 wherein the solution of the oxidizing agent is at a temperature of about 50 to 100° C. and has a pH of 7.5 to 9.

11. The method of claim 5 wherein the solution employed is a 0.5 to 2% solution of sodium hypochlorite having a pH of 7.5 to 9 and wherein said catalyst after being contacted with said solution is subsequently treated with an aqueous solution of hydrogen peroxide.

References Cited in the file of this patent

UNITED STATES PATENTS

| Number | Name | Date |
| --- | --- | --- |
| 1,678,626 | Jaeger | July 24, 1928 |
| 2,191,464 | Gwynn | Feb. 27, 1940 |
| 2,315,518 | Gwynn | Apr. 6, 1943 |
| 2,339,929 | Houghton | Jan. 25, 1944 |